Feb. 25, 1930.  E. J. HIRVONEN  1,748,174
SPINDLE BEARING
Filed April 4, 1929  3 Sheets-Sheet 1

Inventor
Eric J. Hirvonen
By Attorneys
Southgate Fay & Hawley

Feb. 25, 1930.  E. J. HIRVONEN  1,748,174
SPINDLE BEARING
Filed April 4, 1929   3 Sheets-Sheet 2

Inventor
Eric J. Hirvonen
By Attorneys
Southgate Fay & Hanley

Feb. 25, 1930.   E. J. HIRVONEN   1,748,174
SPINDLE BEARING
Filed April 4, 1929   3 Sheets-Sheet 3

Inventor
Eric J. Hirvonen
By Attorneys
Southgate Fay & Barkey

Patented Feb. 25, 1930

1,748,174

UNITED STATES PATENT OFFICE

ERIC J. HIRVONEN, OF WORCESTER, MASSACHUSETTS, ASSIGNOR TO LELAND-GIFFORD COMPANY, A CORPORATION OF MASSACHUSETTS

SPINDLE BEARING

Application filed April 4, 1929. Serial No. 352,563.

This invention relates to a bearing means for a high speed spindle and is particularly adapted for application to the spindle of a grinding machine.

The principal objects of the invention are to provide a ball bearing that will stand up under a very high speed; to provide a simple and convenient means by which either the inner or outer race of a set of ball bearings can be used as the supporting and bearing members of the two ends of a spindle and all those at each end can be adjusted or taken up finely and accurately by a single adjustment; also to provide improvements in the way of connecting the several ball races whereby they will all be adjusted at the same time and to provide eccentric mountings for them to permit of such adjustment to take up wear.

Other objects and advantages of the invention will appear hereinafter.

Reference is to be had to the accompanying drawings in which

Figure 1:
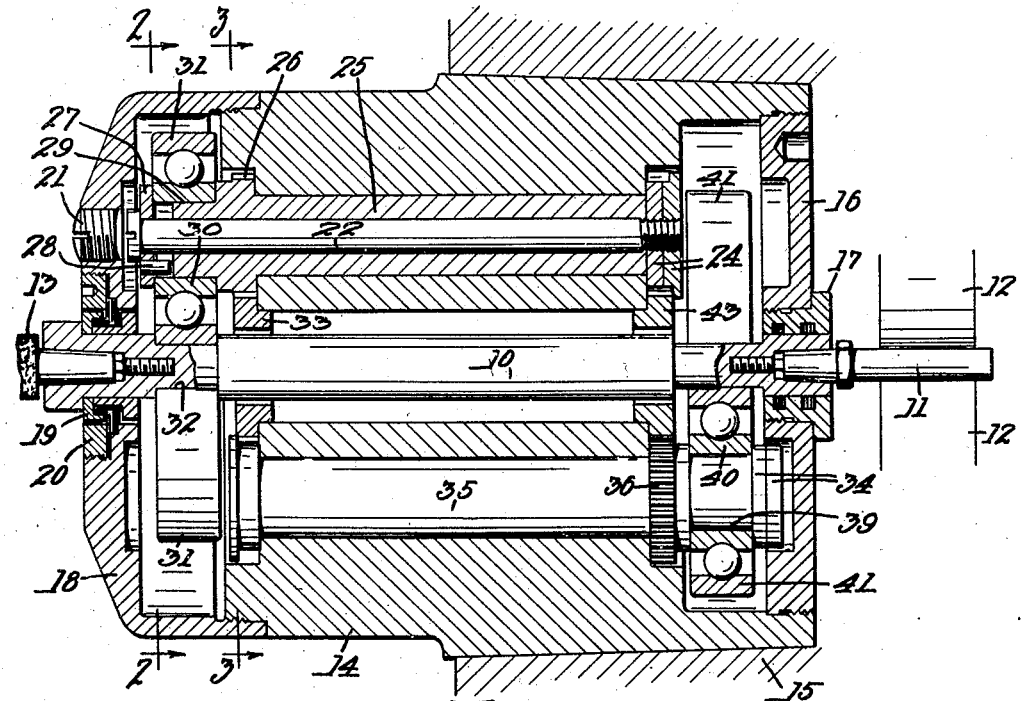
Fig. 1 is a diametrical sectional view of a bearing constructed in accordance with this invention.
Figure 2:
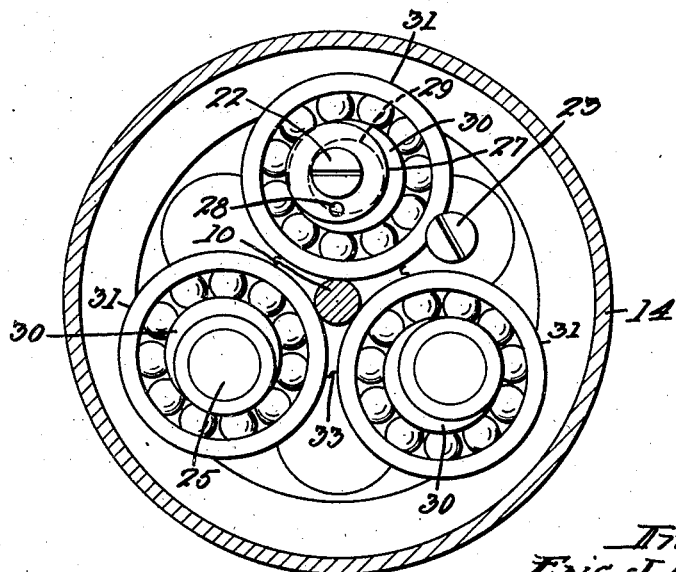
Fig. 2 is a sectional view on the line 2—2 of Fig. 1.
Figure 3:
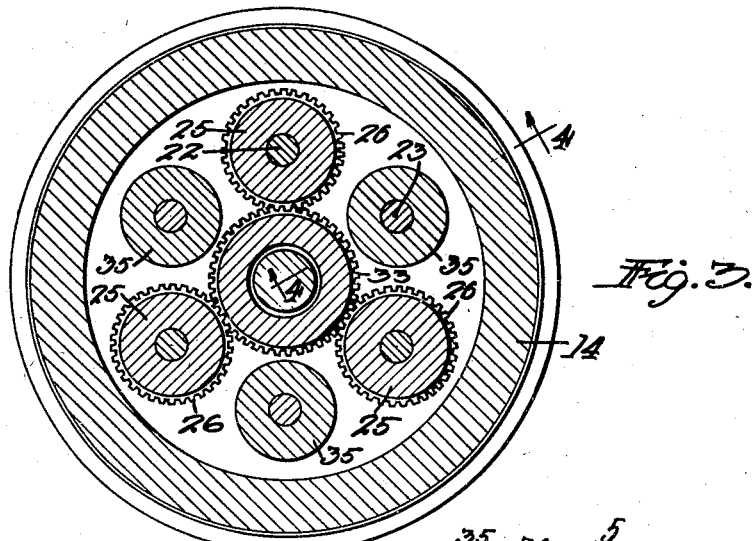
Fig. 3 is a sectional view on the line 3—3 of Fig. 1.
Figure 4:
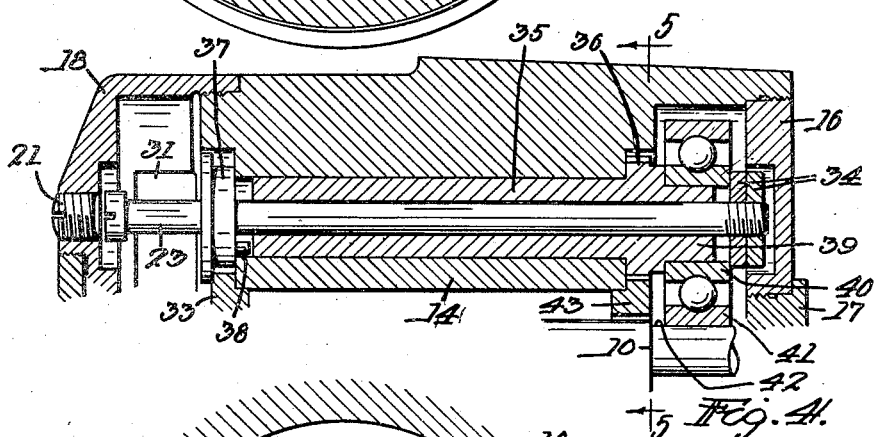
Fig. 4 is a radial sectional view on the line 4—4 of Fig. 3.
Figure 5:
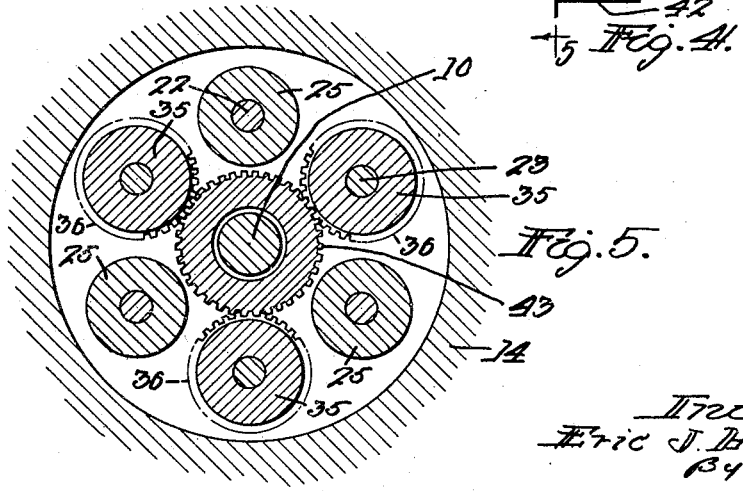
Fig. 5 is a sectional view on the line 5—5 of Fig. 4.

The invention is shown as applied to a spindle 10 of a grinding machine, this spindle being shown as provided with the usual concentric extension 11 for receiving a motion of rotation at an extremely high speed from three wheels 12, or by any other means, and as provided with a grinding wheel 13 at the opposite end secured to it in any usual way. The ball bearings ordinarily employed, even when constructed of the best materials known, will last only a short time at these excessive speeds which may be as much as 60,000 R. P. M. In order to provide the necessary degree of durability I mount the ball bearings in such a way that their speed will be much less than that of the spindle.

A head 14 is carried fixedly in the frame 15 of the machine. This head is provided at the back with an annular plate 16 screwed in and having a plug 17 screwed in the center of it surrounding the end of the spindle 10. On the other end is a screw-cap 18 having a similar central member 19 on the spindle rotating freely in an annular plate 20 screwed into the end of the cap. The other parts are all contained within these elements that have been described.

In screw threaded openings in the cap are two screw plugs 21 adapted to be removed for exposing the heads of two screws 22 and 23. The adjustment is provided for by inserting a screw driver through these openings and turning these screws. The screw 22 is threaded only on its end for receiving a pair of nuts 24 and is located within a sleeve 25 which is provided with a gear 26 thereon. The nuts 24 are adjusted to hold the sleeve between them and the gear 26 in the head 14. Fixed to this screw or shaft 22 is a collar 27 having a pin 28 extending into a notch in the end of the sleeve 25 so that when the screw or shaft 22 is turned by the screw driver the sleeve 25 must necessarily turn with it. This, of course, not only turns the gear 26 but it turns an eccentric end 29 to adjust the position of the inner race 30 of a ball bearing mounted on this end. The ball bearing also has an outer race 31. The inner race is held against longitudinal shifting by the collar 27. There are three of these structures equally spaced about the spindle 10 and the three external ball races 31 bear against the spindle 10 at its outer end in a groove 32 provided for that purpose. The three gears 26 are all of the same size and they all mesh with a gear 33 centrally located with respect to the spindle 10 but free from it. Thus, it will be seen that the turning of one of the shafts 22 will turn these three gears 26 and change the eccentric position of the three inner ball races 30, all to the same degree and thus take up the wear on the spindle at that end accurately, without getting it out of center.

The other screw plug 21 covers the screw 23 inside which is constructed in a similar way with nuts 34, sleeve 35 and gear 36. This gear, however, is located at the opposite end of the bearing. On the outer end is a fixed collar 37 having its pin 38 and the sleeve has an eccentric portion 39 at the inner end supporting the inner race 40 of the ball bearing located there. These nuts 34 engage the edge of the inner race 40. The outer race 41 engages the spindle 10 in a groove 42 provided for that purpose. A central gear 43 meshes with the three gears 36 and, like the gear 33, has its bearing on the inner edge of the head 14.

It will be seen that the two ends of the spindle are supported in similar ways and that the turning of the shafts 22 or 23 will result in changing the positions of the eccentrics 29 or 39 around the spindle 10 and taking up the wear at either end of that spindle finely and accurately. Only one adjustment is required for the three supporting bearings at each end and there is no danger of anything happening to get the eccentrics out of the position in which they are originally set. The chief feature of the invention, however, is the fact that the several ball bearings, having diameters several times the diameter of the spindle where they bear on it, will have to rotate very much slower than the spindle and much slower than would a ball bearing mounted on the spindle itself. Therefore their life is comparatively great.

Figure 6:
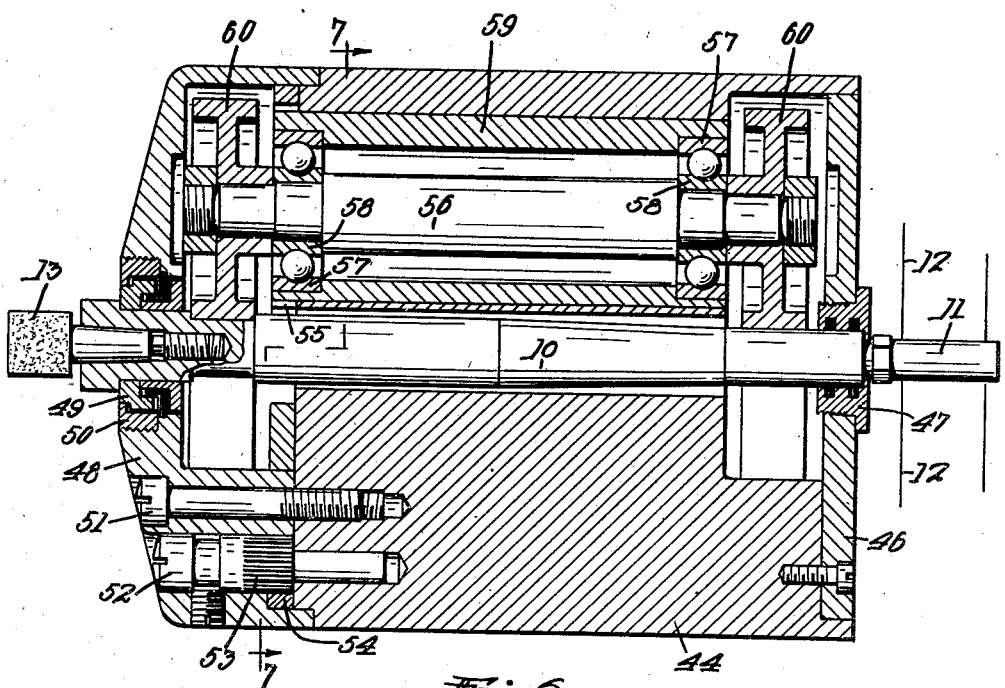
Fig. 6 is a view similar to Fig. 1 of a modified form of the invention.
Figure 7:
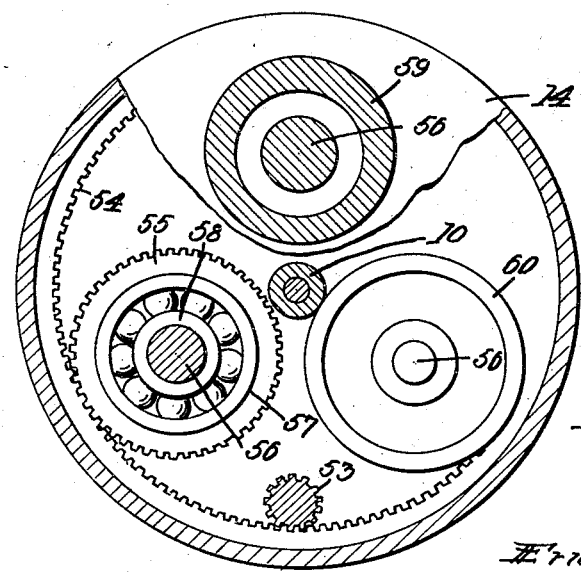
Fig. 7 is a sectional view of the same on the broken line 7—7 of Fig. 6.

In the form shown in Figs. 6 and 7 two changes are made. Three adjusting shafts are used instead of six, having their adjustments at both ends, and the spindle 10 is supported by the inner races of the ball bearings instead of the outer races. In this case a head 44 is shown having a plate 46 and central hub 47 at one end and a cap 48 at the other with rings 49 and 50 as described before. The cap 48 is held in stationary position with respect to the head 44 by one or more screws 51 while a single adjusting screw 52 is inserted in the cap having a pinion 53 fixed thereon which meshes with an internal gear 54 carried in this case by the cap. This provides the adjustment and it meshes with three gears 55 carried on as many sleeves 59. The three shafts 56 carry ball bearings at each end having an outer race 57 and an inner race 58, the inner race bearing on the shaft 56 and the outer races being carried directly by the sleeves 59 in sockets provided for the same. These outer races are eccentrically mounted in the sleeves 59 in which they are carried, which sleeves carry the gears 55 so it will be seen that, by turning these gears in the manner described, the sleeves will be turned and the position of the shafts 56 will be changed. Beyond the inner races 58 on the shafts 56 or integral with them if desired, are bearing wheels 60. It will be noted that these parts just described are duplicated at the two ends of the machine.

The six bearing wheels 60 on the three shafts 56 bear on the spindle 10 in grooves around the same and support it. Thus it will be seen that the adjustment of the screw 52 will adjust each of the eccentric bearings equally and take up wear on the spindle 10 which is supported really by inner races of the ball bearings instead of directly by the outer races as in the form shown in the first five figures.

In both forms the adjustment is simple and accurate and there is no way for the parts to get out of center and no occasion for much wear on the adjusting surfaces but wear on the bearing surfaces can be taken up very easily by this adjustment.

Although I have illustrated and described only two forms of the invention I am aware of the fact that other modifications can be made therein by any person skilled in the art without departing from the scope of the invention as expressed in the claims.

Therefore, I do not wish to be limited in this respect but what I do claim is:—

1. In a bearing for a spindle or shaft, the combination with a supporting hub and said spindle of a set of ball bearings arranged around the spindle and bearing on it, an eccentric support for each ball bearing and means for simultaneously adjusting the supports of said ball bearings from a single one of them to take up wear all around the spindle equally.

2. In a spindle supporting device, the combination with a spindle and a support in which it is mounted, of a plurality of shafts arranged around the spindle in the support, a gear on each shaft, a central gear free to turn, and meshing with all of the said gears, ball bearings supporting said spindle at one end, eccentric means connected with each of said shafts for carrying one of the ball bearings, whereby when one of said eccentric means is turned the other two will be turned through the said gears to adjust all the ball bearings equally toward the axis of the spindle.

3. The combination with a spindle and a supporting means therefor, of a series of three ball bearings for carrying each end of the spindle, three sleeves having eccentric portions on which the inner races of the ball bearings at each end are mounted, and means for connecting the three spindles supporting each end of the sleeve together so that they will have to turn together for adjustment, the outer races of said ball bearings bearing directly on the spindle and supporting it.

4. In a device of the character described, the combination of two sets of three shafts, means at one end of the structure for turning each of said shafts, a sleeve in which each shaft is located, a collar fixed on one shaft of each set and having a pin engaging in the corresponding sleeve, whereby the sleeve will turn with the shaft, each sleeve having an eccentric projection, an internal race for a ball bearing mounted on said projection, the external races of said ball bearings bearing directly on the spindle to be supported, whereby the bearings of each end of the spindle can be taken up independently of those at the other end.

5. In a device of the character described, the combination of three shafts surrounding a central axis, a ball bearing at the end of each shaft, the inner races of said ball bearings being mounted on said shafts, three sleeves carried at both ends by the outer races of said ball bearings, the outer races being set eccentrically in said sleeves and the sleeves supported concentrically, a wheel on each end of each shaft supported like the inner races of the ball bearings, said wheels being adapted to bear on the surface of the spindle to be supported near each end, a gear on each sleeve, and an internal gear surrounding the three gears and meshing with them, whereby by the turning of the internal gear the three sleeves will be turned equally to give equal adjustment to the six bearings.

6. In a device of the character described, the combination with a spindle, and means for driving the spindle at high speed, of a bearing device for the spindle comprising anti-friction bearings arranged around the axis in the spindle and each bearing having a race bearing on the spindle, said spindle having a groove therearound for receiving said recess whereby the speed of the races will be very much less than the speed of the spindle, each of said races being mounted eccentrically and means for adjusting the said races simultaneously to take up wear.

In testimony whereof I have hereunto affixed my signature.

ERIC J. HIRVONEN.